(12) United States Patent
Maeda (10) Patent No.: US 6,390,658 B2
(45) Date of Patent: May 21, 2002

(54) VEHICLE LAMP DEVICE SUPPORTING STRUCTURE

(75) Inventor: Tarou Maeda, Aki-gun (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/789,717

(22) Filed: Feb. 22, 2001

(30) Foreign Application Priority Data

Feb. 23, 2000 (JP) ........................................ 2000-045375

(51) Int. Cl.[7] ................................................ B60Q 1/00
(52) U.S. Cl. ...................... 362/546; 362/450; 362/549; 293/120
(58) Field of Search ................................ 362/549, 507, 362/505, 546, 450, 369, 390; 293/120

(56) References Cited

U.S. PATENT DOCUMENTS 6,033,095 A * 3/2000 Ognian ........................ 362/267
6,190,030 B1 * 2/2001 Chase .......................... 362/369

FOREIGN PATENT DOCUMENTS

JP      09-030321 A     2/1997

* cited by examiner

*Primary Examiner*—Sandra O'Shea
*Assistant Examiner*—John Anthony Ward
(74) *Attorney, Agent, or Firm*—Nixon Peabody LLP; Donald R. Studebaker (57) ABSTRACT

A vehicle lamp device supporting structure 5 for supported by a front end of a vehicle, comprises a fragile portion 21 breakable in vehicle collision. The fragile portion is provided in mount brackets 7, 8 and 9 which protrude from a housing 10 of the lamp device 5. A shroud panel 4 supporting the lamp device 5 includes an opening 2 to allow the lamp device 5 to be displaced rearward when the mount brackets 7, 8 and 9 are broken up.

9 Claims, 12 Drawing Sheets

INPACT FORCE

INPACT FORCE

INPACT FORCE

VEHICLE LAMP DEVICE SUPPORTING STRUCTURE

FIELD OF THE INVENTION

The present invention relates to a vehicle lamp device supporting structure for supporting a vehicle lamp device, such as a headlamp unit, on the front end of a vehicle.

BACKGROUND OF THE INVENTION

Heretofore, in vehicles equipped with a bumper and a headlamp as a vehicle lamp device, in order to absorb the impact on the occasion when a vehicle collides with obstacle, some vehicle lamp device supporting structure is adapted to allow the headlamp to be displaced rearward along with deforming the bumper.

Figure 15:
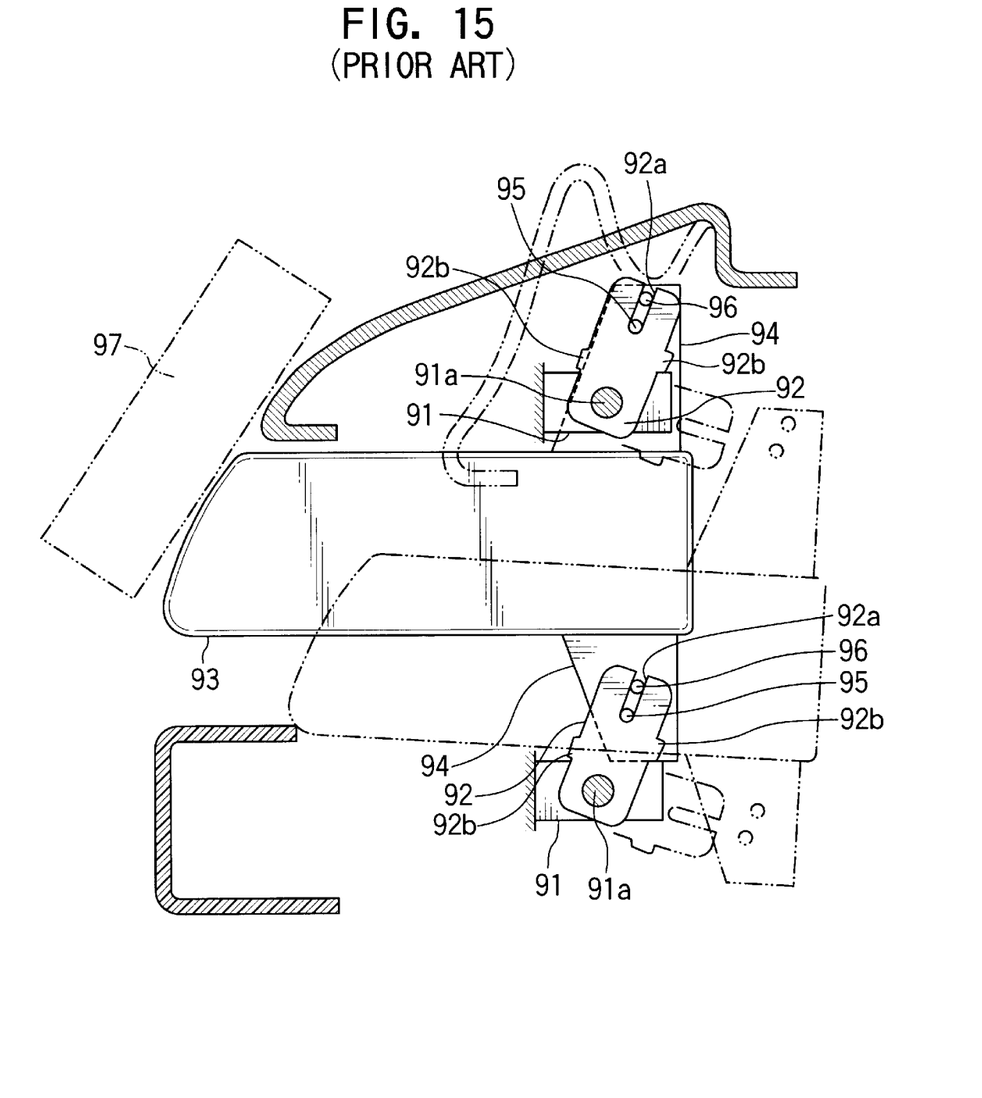
FIG. 15 is a sectional view showing a prior art vehicle lamp device supporting structure.

Specifically, in one example shown in FIG. 15, the structure includes an inclinable stay 92 pivotally mounted through a pin 91a on a member 91 fixed to a vehicle body, and a stepped bolt 95 screwed to a bracket 94 which is formed integrally with a headlamp 93. The stepped bolt 95 is engaged with a slit 92a of the inclinable stay 92, and an engagement-projecting portion 96 formed on the bracket 94 is engaged with the slit 92a. The inclinable stay 92 is also provided with a claw 92b contacted to the member 91 fixed to the vehicle body. When the headlamp 93 is displaced rearward by an external force in vehicle collision, an input load exceeding a predetermined value releases the engagement between the engagement projecting portion 96 and the slit 92a. This makes the claw 92b bend to allow the inclinable stay 92 rotate. Consequently, the impact acting to the headlamp 93 is absorbed. Further, the stepped bolt 95 is disengaged from the slit 92a, and the headlamp 93 is moved downward and rearward as shown by the hypothetical line in FIG. 15 according to the movement of the inclinable stay 92 so as to reduce the impact to obstacle 97 (see Japanese Patent Laid-Open Publication No. Hei 09-30321).

This prior art structure is advantageous to reducing the impact to the obstacle 97 by the displacement of the headlamp 93. On the other hand, the structure involves a problem of its increased number of parts, increased man-hour for assembling, and high cost, caused by the resulting complicate structure having movable parts.

SUMMARY OF THE INVENTION

It is an object of the present invention to provide a vehicle lamp device supporting structure capable of reducing the impact to obstacle in vehicle collision with the obstacle, with a simple and inexpensive structure, by providing a fragile portion breakable in collision in a mount bracket mounted to a housing of the lamp device and an opening formed in a shroud panel to allow the lamp device to be displaced rearward in collision.

It is another object of the present invention to provide a vehicle lamp device supporting structure capable of facilitating to simplifying its structure by providing a thin walled portion in the mount bracket as the aforementioned fragile portion.

It is yet another object of the present invention to provide a vehicle lamp device supporting structure capable of reliably displacing the lamp device rearward by providing a projecting portion, which projects into the opening, in the aforementioned shroud panel to support the mount bracket of the lamp device so as to contribute to break up the mount bracket of the lamp device by bending the projecting portion through the input load in colliding.

It is still another object of the present invention to provide a vehicle lamp device supporting structure capable of reducing the impact to obstacle by displacing the lamp device rearward in vehicle collision with the obstacle, particularly of rotatably displacing the lamp device rearward around a vertical support shaft as a fulcrum by the input load from a laterally offset position of the lamp device, with a simple and inexpensive structure, by providing a bracket for mounting the right and left sides of the lamp device to the shroud panel through the support shaft, a fragile portion breakable in collision in the bracket, and an opening in the shroud panel to allow the lamp device to be displaced rearward.

It is a further object of the present invention to provide a vehicle lamp device supporting structure capable of reducing the impact to obstacle by displacing the lamp device rearward in vehicle collision with the obstacle, with a simple and inexpensive structure, by providing a fragile portion breakable in collision on a mount portion of the shroud panel to which the lamp device is mounted, and forming an opening on the shroud panel to allow the rearward displacement of the lamp device.

It is yet a further object of the present invention to provide a vehicle lamp device supporting structure capable of applying to a resin shroud having an excellent in productivity because the overall shroud may be made by integrally molding with synthetic resin, and facilitating to simplify its structure by forming the shroud panel and the fragile portion with a resin shroud and a thin walled portion respectively.

In order to achieve the objects described above, according to one aspect of the present invention, comprising a mount bracket mounting the lamp device to a vehicle body side, the mount bracket projectedly provided on a housing of the lamp device, wherein the mount bracket including a fragile portion breakable in vehicle collision, and a shroud panel supporting said lamp device, wherein said shroud panel including an opening allowing said lamp device to be displaced rearward when said mount bracket is broken up.

By virtue of the aforementioned structure, when the vehicle collides with obstacle, the fragile portion is broken up (or cut) by the input load given to the mounted bracket through the lamp device, and this breakage of the fragile portion results in no support of the lamp device to the shroud panel. Then, the lamp device may be displaced rearward through the opening.

Thus, when the vehicle collides with obstacle, the impact to the obstacle may be reduced by displacing the lamp device rearward, with a simple and inexpensive structure having the fragile portion in the mount bracket.

According to one embodiment of the present invention, the fragile portion is comprised of a thin walled portion provided in the mount bracket.

In the aforementioned structure, the fragile portion comprises the thin walled portion without any movable portion so that simplification in structure may be facilitated.

According to another embodiment of the present invention, the shroud panel is provided with a projecting portion projecting into the opening of and supporting the mount bracket of the lamp device.

In the aforementioned structure, the projecting portion is bent rearward by an input load in collision, and this bending contributes to break up the mount bracket so that the lamp device may be further reliably displaced rearward.

According to another aspect of the present invention, a vehicle lamp device supporting structure for supporting a vehicle lamp device on the front end of a vehicle, comprises a bracket mounting both right and left side portions of the lamp device to the shroud panel through a vertical support shaft, wherein the bracket is provided with a fragile portion breakable in vehicle collision, and the shroud panel is provided with an opening allowing the lamp device to be displaced rearward when the bracket is broken up.

By virtue of this structure, when a vehicle collides with obstacle, particularly when the collision with obstacle occurs either at right or left offset position with respect to the lamp device, the bracket located on one side input the collision load is broken up at the fragile portion, and the lamp device is then rotatably displaced around the support shaft of another bracket located on another side as a fulcrum.

Rotating and displacing the lamp device rearward allows the impact to the obstacle to be reduced. Further, a simple and inexpensive support structure may be provided.

According to a further aspect of the present invention, a vehicle lamp device supporting structure for supporting a vehicle lamp device on the front end of a vehicle, comprises a shroud panel including a mount portion for mounting the lamp device, wherein the shroud panel is provided with a fragile portion breakable in vehicle collision, and the shroud panel is adapted to form an opening allowing the lamp device to be displaced rearward when the fragile portion is broken up.

By virtue of the aforementioned structure, when a vehicle collides with obstacle, the mount portion is broken up at the fragile portion by the input load given to the mount portion of the shroud panel through the lamp device, and this breakage of the fragile portion results in no support of the lamp device to the shroud panel. Then, the lamp device may be displaced rearward through the opening.

Thus, when a vehicle collides with obstacle, the impact to the obstacle may be reduced by displacing the lamp device rearward, with a simple and inexpensive structure having the fragile portion in the mount bracket.

According to another embodiment of the present invention, the shroud panel is formed by a resin shroud and the fragile portion is formed by a thin walled portion.

By virtue of the aforementioned structure, the vehicle lamp device supporting structure may be applied to a resin shroud having an excellent in productivity because the overall shroud may be made by integrally molding with synthetic resin, and the simplicity in structure may be further facilitated.

DETAILED DESCRIPTION OF THE PREFERRED EMBODIMENTS

Exemplary embodiments of the present invention will now be described with reference to the drawings.

Figure 1:
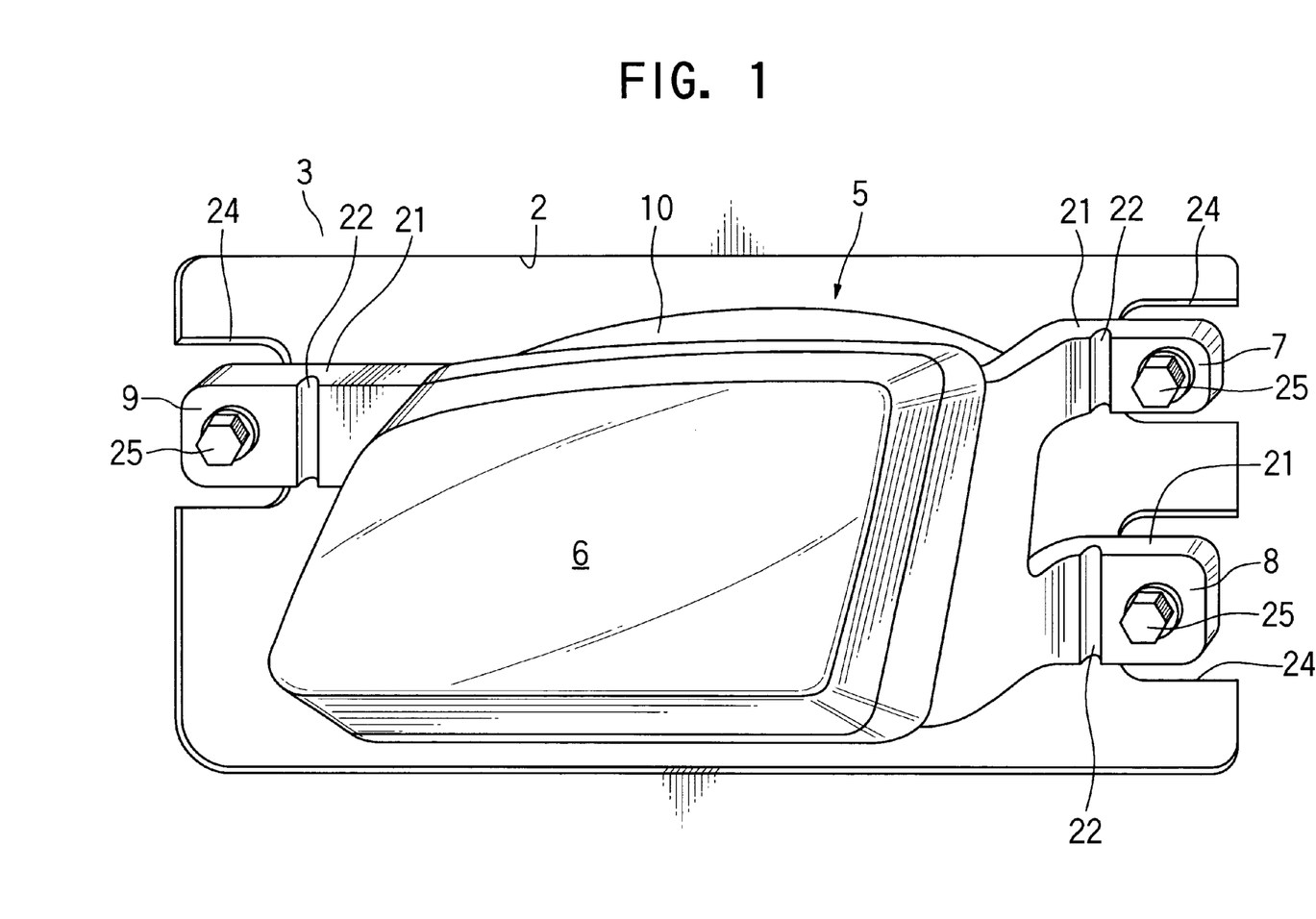
FIG. 1 is a perspective view showing a vehicle lamp device supporting structure according to the present invention.
Figure 2:
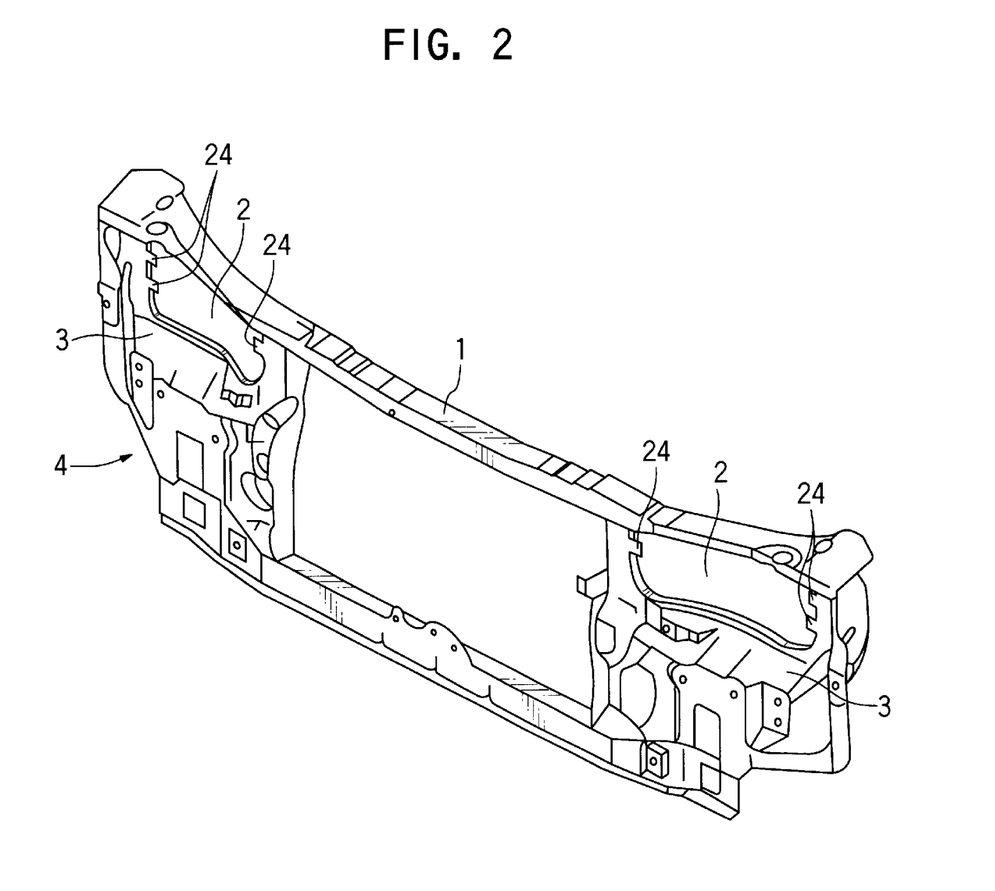
FIG. 2 is a perspective view showing a shroud panel made of metal.

The figures show a vehicle lamp device supporting structure. FIGS. 1 and 2 includes a shroud upper member 1, and a shroud panel 4 (i.e. an iron plate shroud) having right and left shroud side panels 3 which are respectively provided with an opening 2 for arranging the lamp device.

This shroud panel 4 is placed in the front end of an engine room in the width direction of the vehicle. As shown in FIG. 1, the shroud panel is adapted to support a headlamp unit 5 as a lamp device at the position where the opening 2 of the shroud panel 4 is formed.

Figure 3:
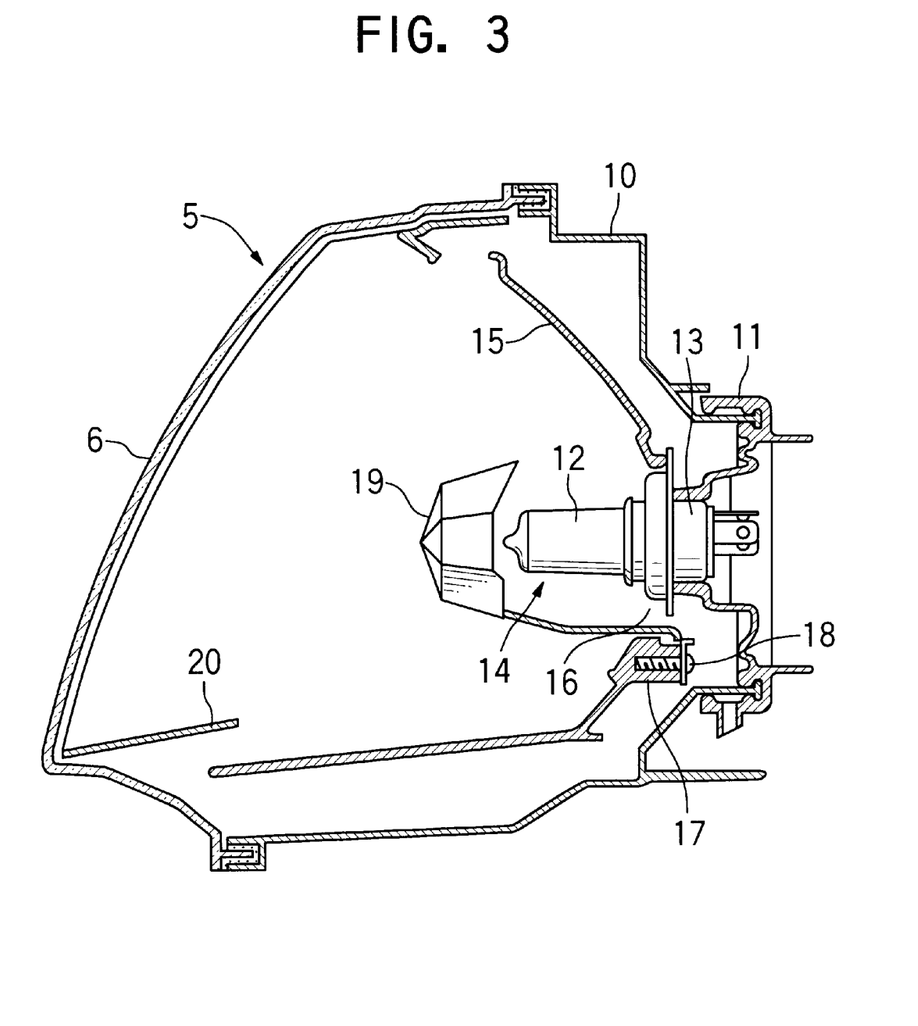
FIG. 3 is a sectional view of a headlamp unit.

As shown in FIG. 3, the above-mentioned headlamp unit 5 comprises an outer lens 6 as a lamp lens located at the front side of the headlamp unit, a plurality of mount brackets 7, 8 and 9 for mounting the headlamp unit to the vehicle body side (see FIG. 1), and a lamp housing 10 made of synthetic resin at the rear side of the headlamp unit.

At approximately center of the lamp housing 10, a headlamp 14 comprising a valve 12 and a socket 13 by using a rubber cover 11 is mounted to position the headlamp 14 within a lamp chamber surrounded by the outer lens 6 and the lamp housing 10.

A reflector 15 as a reflecting mirror is provided to irradiate light of the above headlamp 14 frontward of the vehicle. The above headlamp 14 is placed in a lamp layout hole 16 of the reflector 15 and if necessary, a shade 19 may be mounted to a mount portion 17 which is provided at the lower side of the hole edge of the lamp layout hole 16 by using a screw 18 (mounting member).

Between the outer lens 6 and the reflector 15 is provided an approximately cylindrical bezel 20 for preventing the interior of the lamp device from being unnecessarily transparent and for obtaining ornamental effect.

As shown in FIG. 1, fragile portions 21 breakable or broken in vehicle collision are provided for the aforementioned mount brackets 7, 8 and 9, respectively, which are provided to protrude from the lamp housing 10 toward right and left.

In this embodiment, a groove 22 is formed to extend vertically in a predetermined portion of each of the mount brackets 7, 8 and 9 (i.e. a position in the opening 2 more inboard than the inner end face of each projecting portion 24 described later). A thin walled portion 23 having a smaller thickness (see FIG. 4) forms each of the fragile portions 21 by forming the groove 22.

On the other hand, the opening 2 formed on the shroud side panel 3 has an opening area and opening configuration to allow the headlamp unit 5 to be displaced rearward when the mount brackets 7, 8 and 9 are broken up. The projecting portions 24 are integrally formed with the shroud side panel 3 to project inward the opening 2 corresponding to the mount brackets 7, 8 and 9.

Figure 4:
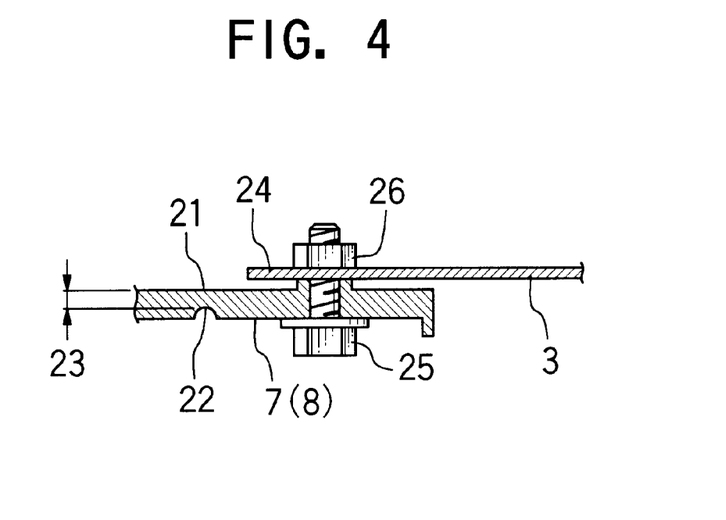
FIG. 4 is a partially enlarged sectional view of FIG. 1.

Thus, as shown in FIGS. 1 and 4, the mount brackets 7, 8 and 9 of the headlamp unit 5 is contacted to the front face of the projecting portion 24 of the shroud side panel 3, and the headlamp unit 5 is placed to the projecting portion 24 and fixedly supported thereon through screwing bolts 25 and nuts 26.

On the condition that the embodiment shown in the figures are constructed as described above, its action will now be described.

Figure 5:
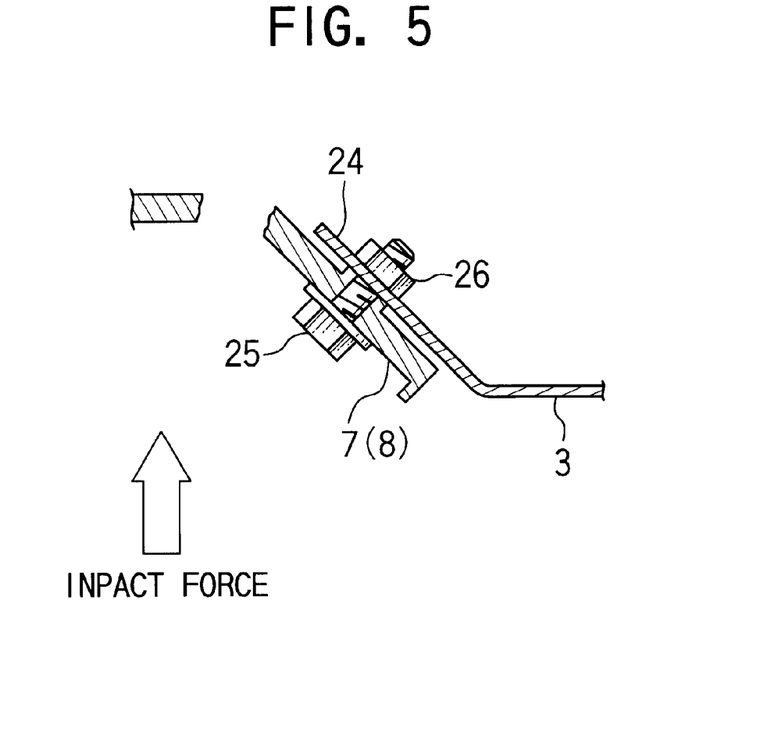
FIG. 5 is a sectional view showing the movement in vehicle collision.

When a running vehicle collides with obstacle head-on, an impact load is input to the mount brackets 7, 8 and 9 through the outer lens 6 and the lamp housing formed of synthetic resin 10 of the headlamp unit 5. As shown in FIG. 5, due to this input load, the projecting portion 24 near the shroud side panel 3 is bent rearward from the position corresponding to the opening edge of the opening 2. Due to the bending of the projecting portion 24, a shearing force acts on the fragile portion 21 of the mount brackets 7, 8 and 9 to break up the fragile portion 21.

When the fragile portion 21 is broken up, the headlamp unit 5 loses any support to the shroud side panel 3, and it moves rearward through the opening 2. Thus, the impact to the obstacle may be reduced.

As described above, the vehicle lamp device supporting structure in the embodiment shown in FIGS. 1 to 5 comprises the headlamp unit 5 supported by a front end of a vehicle, in which the mount brackets 7, 8 and 9 for mounting the headlamp unit 5 to the vehicle body side are provided with the fragile portion 21 breakable in vehicle collision and protruding from the lamp housing 10 of the headlamp unit 5, and the shroud panel 4 supporting the headlamp unit 5 is provided with the opening 2 allowing the headlamp unit 5 to be displaced rearward when the mount brackets 7, 8 and 9 are broken up at the fragile portion 21.

Thus, when the vehicle collides with obstacle head-on, the fragile portion 21 is broken up or cut by the input load given to the mount brackets 7, 8 and 9 through the headlamp unit 5. This breakage of the fragile portion 21 results in no support of the headlamp unit 5 to the shroud panel 4. Thus, the headlamp unit 5 is displaced rearward by the opening 2.

Therefore, when the vehicle collides with obstacle, the headlamp unit 5 may be displaced rearward so that the impact to obstacle may be reduced. In addition, the simple structure having the fragile portion 21 provided at the mount brackets 7, 8 and 9 allows the vehicle lamp device supporting structure to be achieved at lower cost.

The aforementioned fragile portion 21 is constructed by the thin walled portion 23 see FIG. 4) provided at each of the mount brackets 7, 8 and 9, and any movable portion is not necessary so that the structure may be more simplified.

Further, the shroud panel 4 has the projecting portion 24 which projects into the opening 2 and supports the mount brackets 7, 8 and 9 of the headlamp unit 5. Thus, in collision, first, the projecting portion 24 is bent rearward by the input load, which makes it easier to broken up the mount brackets 7, 8 and 9, and the headlamp unit 5 may be more reliably displaced rearward in vehicle collision.

Figure 6:
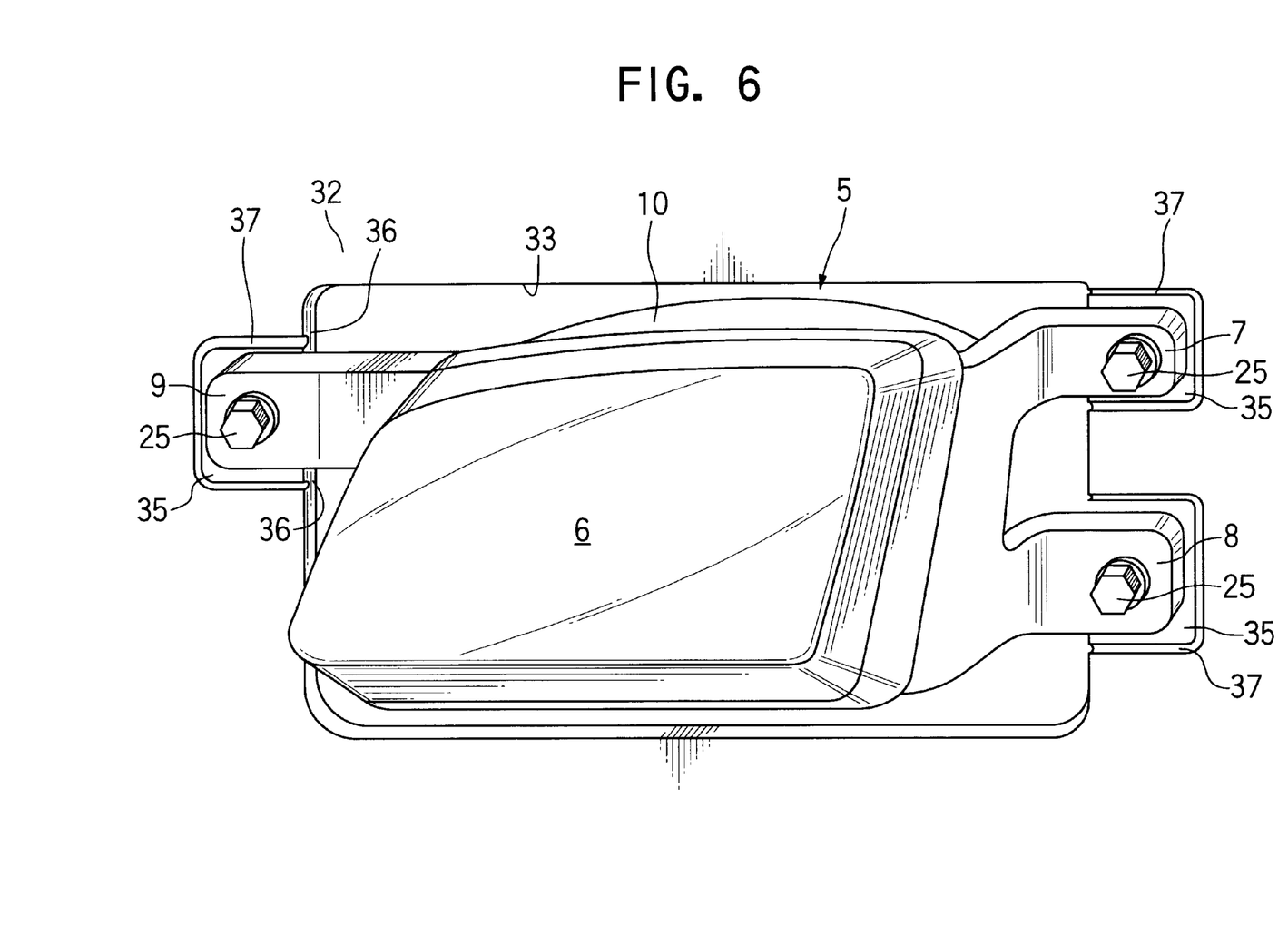
FIG. 6 is a perspective view showing another embodiment of the vehicle lamp device supporting structure according to the present invention.
Figure 7:
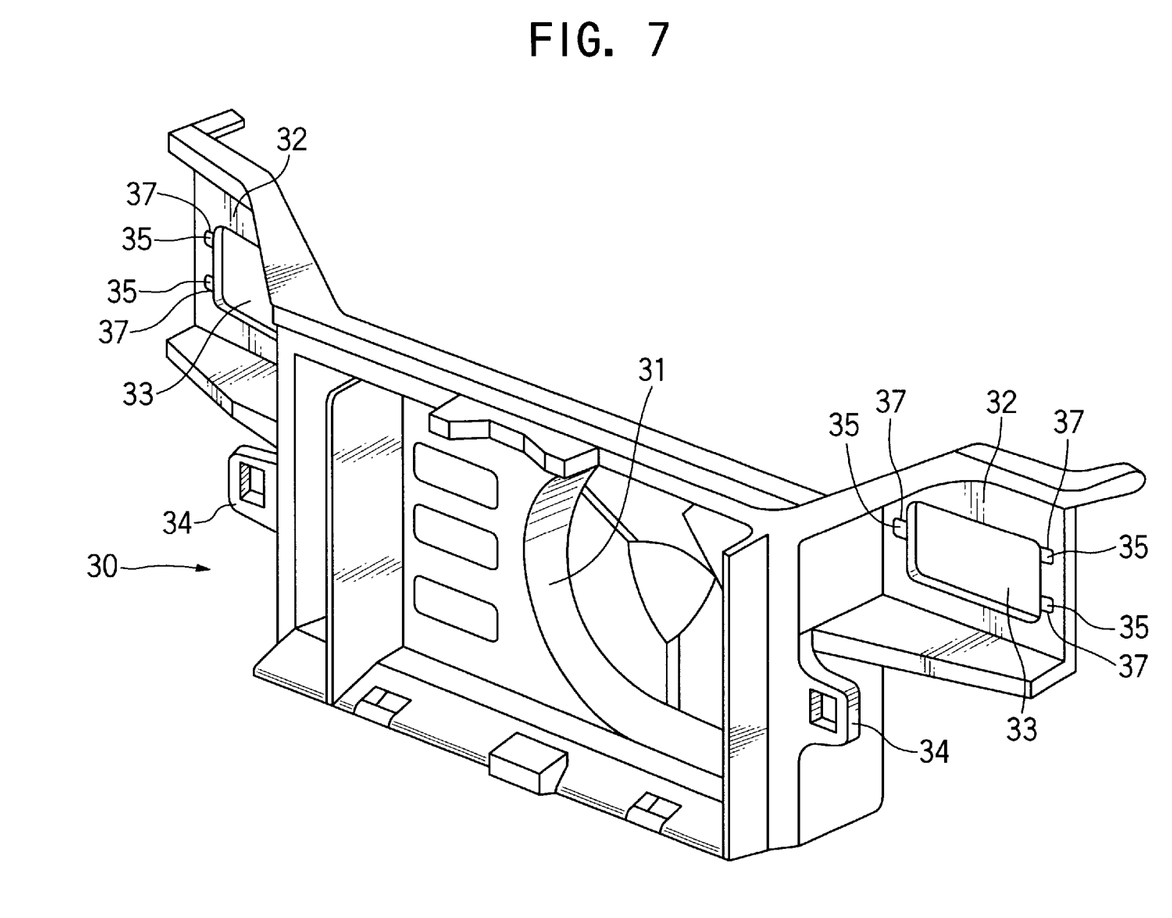
FIG. 7 is a perspective view showing a resin shroud.
Figure 8:
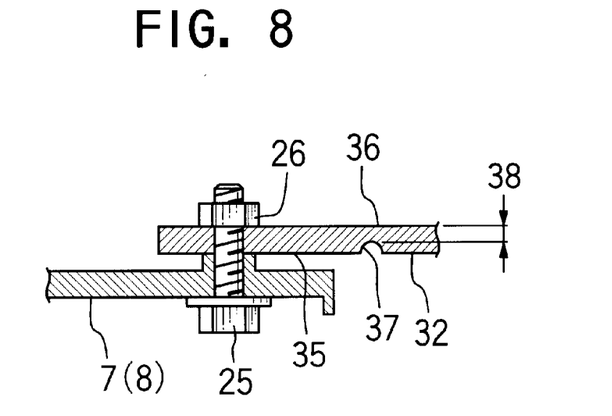
FIG. 8 is a partially enlarged sectional view of FIG. 6.

FIGS. 6, 7 and 8 show another embodiment of the vehicle lamp device supporting structure. While the embodiment shown in FIGS. 1 to 5 has shown the support structure suitable for an iron plate shroud (the shroud panel 4 made of metal), this embodiment of FIGS. 6 to 8 shows the support structure for a resin shroud 30.

Specifically, as shown in FIG. 7, the resin shroud 30 comprises a fan cowl 31, right and left shroud side portions 32, an opening 33 formed on the shroud side portion 32 for arranging the lamp device therein, and frame mount portions 34 for mounting the shroud 30 to a front side frame (not shown). This structure aims to reduce the number of parts and the weight of the shroud and to enhance the productivity.

As shown in FIG. 6, the headlamp unit 5 as a lamp device is supported at the position where the opening 33 of the resin shroud 30 is formed.

Thus, as shown in FIGS. 6 and 7, lamp mount portions 35,—are provided at the opening edge of the opening 33 corresponding to the mount brackets 7, 8 and 9 (however, this embodiment is different from the previous embodiment in that these have no grooves 22) at the side of the headlamp unit 5, and a fragile portion 36 breakable in vehicle collision (see FIG. 8) is provided in the lamp mount portion 35.

In this embodiment, a groove 37 is formed to surround the lamp mount portion 35 in the shape of "U". A thin walled portion 38 having a smaller thickness make up the fragile portion 36 by forming the groove 37. The groove 37 is formed to make its end reach the opening 33.

On the other hand, the opening area and opening configuration of the opening 33 to be formed in the shroud side portion 32 of the resin shroud 30 when the fragile portion 36 is broken up is adapted to allow the headlamp unit 5 to be replaced rearward. Thus, as shown in FIGS. 6 and 8, the mount brackets 7, 8 and 9 of the headlamp unit 5 protruding toward right and left from the headlamp unit is contacted to the front face of the lamp mount portion 35 of the shroud portion 32, and the headlamp unit 5 is placed to the projecting portion 35 and the headlamp unit 5 is clamped to the lamp mount portion 35 and fixedly supported thereon by screwing bolts 25 and nuts 26.

The action of the vehicle lamp device supporting structure structured as described above will now be explained.

Figure 9:
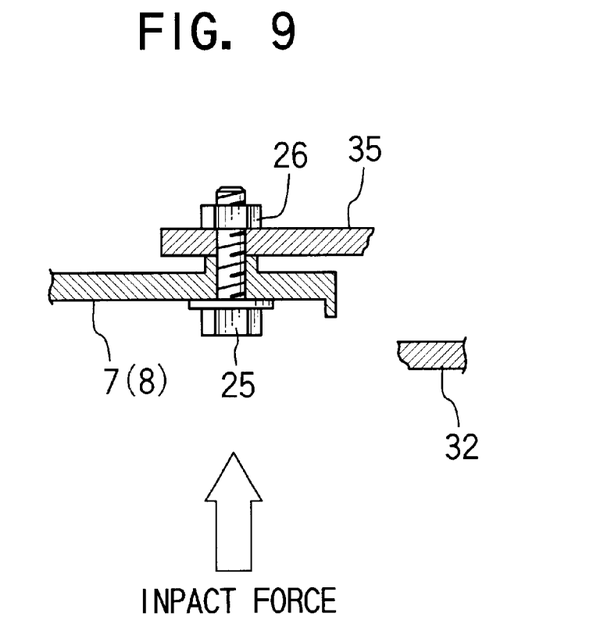
FIG. 9 is a sectional view showing the movement in vehicle collision.

When the running vehicle collides with obstacle head-on, the impact load is input to the lamp mount portion 35 of the resin shroud 30 through the outer lens 6, the lamp housing made of synthetic resin, and the mount brackets 7, 8 and 9 of the headlamp unit 5. Then, due to this input load, a shearing force acts on the fragile portion 36 of the lamp mount portion 35. Thus, as shown in FIG. 9, the fragile portion 36 is broken up, and the lamp mount portion 35 is separated from the shroud side portion 32.

When the lamp mount portion 35 is separated from the shroud side portion 32, the headlamp unit 5 loses any support to the shroud side portion 32, and it moves rearward through the opening 33. Thus, the impact to the obstacle may be reduced.

As described above, the vehicle lamp device supporting structure in the embodiment shown in FIGS. 6 to 9, comprises the headlamp unit 5 supported by a front end of vehicle, in which the fragile portion 36 breakable in vehicle collision is provided to the mount portion (see the lamp mount portion 35) of the shroud panel (see the resin shroud 30) to which the headlamp unit 5 is mounted, and the shroud panel (see the resin shroud 30) is provided with the opening 33 allowing the headlamp unit 5 to be displaced rearward when the fragile portion 36 is broken up.

Thus, when the vehicle collides with obstacle head-on, the mount portion (see the lamp mount portion 35) is broken up at the fragile portion 36 by the input load given to the mount portion (see the lamp mount portion 35) of the shroud panel (see the resin shroud 30) through the headlamp unit 5. Due to the breakage of the fragile portion 36, the headlamp unit 5 loses any support to the shroud panel (see the resin shroud). Then, the headlamp unit 5 is displaced rearward through the opening 33.

Therefore, when vehicle collides with obstacle, the headlamp unit 5 may be displaced rearward so that the impact to obstacle may be reduced. In addition, the simple structure having the fragile portion 36 in the mount portion (see the lamp mount portion 35) of the shroud panel (see the resin shroud panel 30) allows the vehicle lamp device supporting structure to be achieved at lower cost.

Since the shroud panel is formed of the resin shroud 30 and the fragile portion 36 is formed of the thin walled portion 38, the vehicle lamp device supporting structure may be applied to the resin shroud having an excellent in productivity because the overall shroud may be made by integrally molding with synthetic resin. In addition, the simplicity in its structure may be facilitated by forming the shroud panel 36 and the fragile portion 39 with a resin shroud and a thin walled portion respectively.

Figure 10:
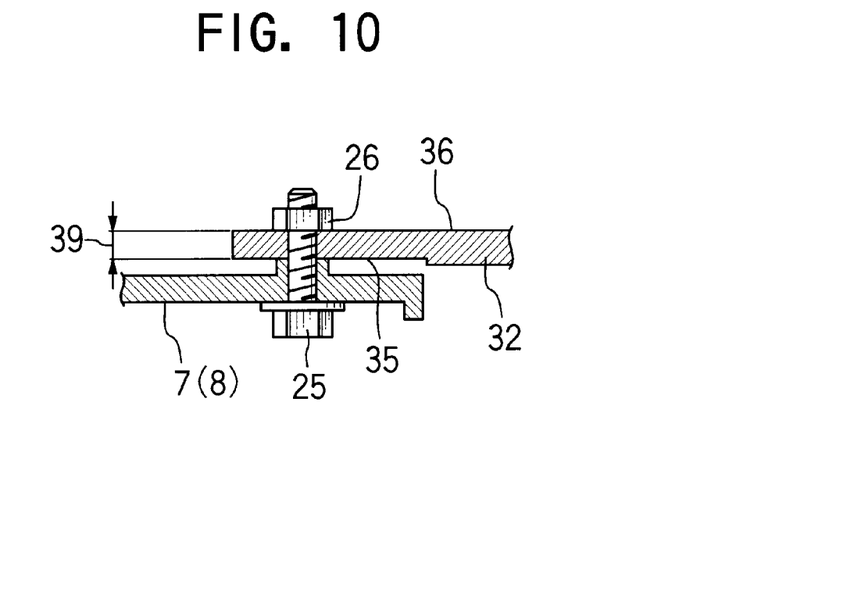
FIG. 10 is a sectional view showing another embodiment of the fragile portion.
Figure 11:
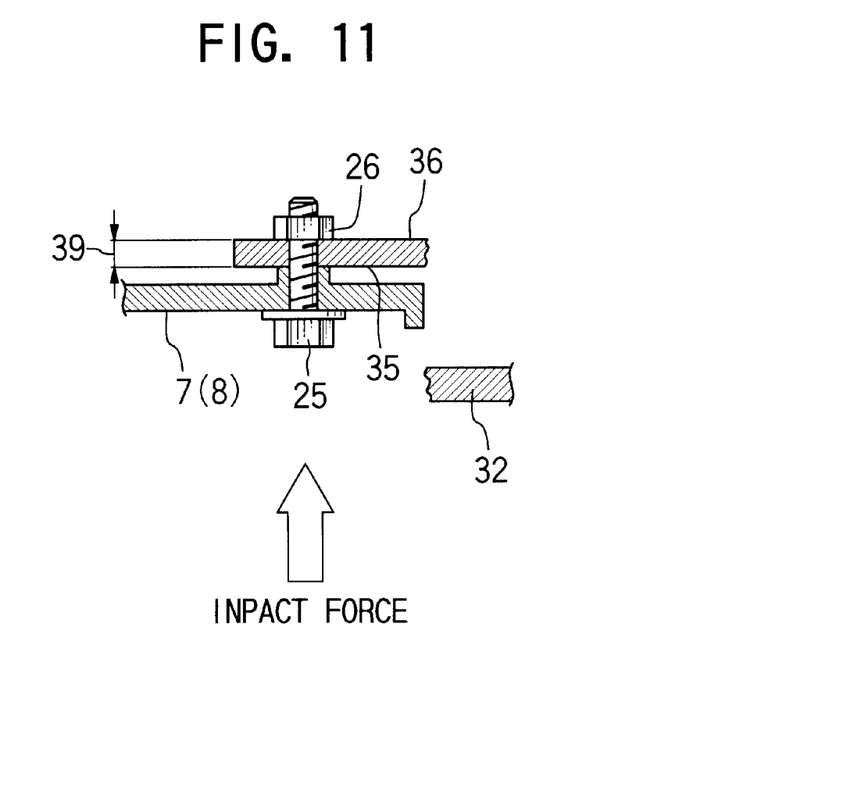
FIG. 11 is a sectional view showing the movement in vehicle collision.

FIGS. 10 and 11 show another embodiment of the vehicle lamp device. In this embodiment, the overall surface of the lamp mount portion 35 arranged in the shroud side portion 32 of the resin shroud 30 (see the previous figure) is formed in a thin walled portion 39, and this thin walled portion 39 forms the fragile portion 36.

The thin walled portion 39 has stepped with respect to the shroud side portion 32 to secure an adequate breakage when the impact load is input. The thin walled portion 39 is also formed in flat to conform to the mount brackets 7, 8 and 9 of the side of the headlamp unit 5.

As shown in FIG. 11, when the vehicle collides with obstacle, the aforementioned construction also realizes that the fragile portion 36 is broken up to separate the lamp mount portion 35 from the shroud side portion 32, and the headlamp unit 5 is moved rearward through the opening 33 (see the previous figure), so that the impact to the obstacle may be absorbed.

The embodiment shown in FIGS. 10 and 11 are same in terms of structure, action and effect as in the embodiment shown in FIGS. 6 to 9. Thus, the same elements in FIGS. 10 and 11 as the aforementioned figures are defined by the same reference numbers, and their description will be omitted.

Figure 12:
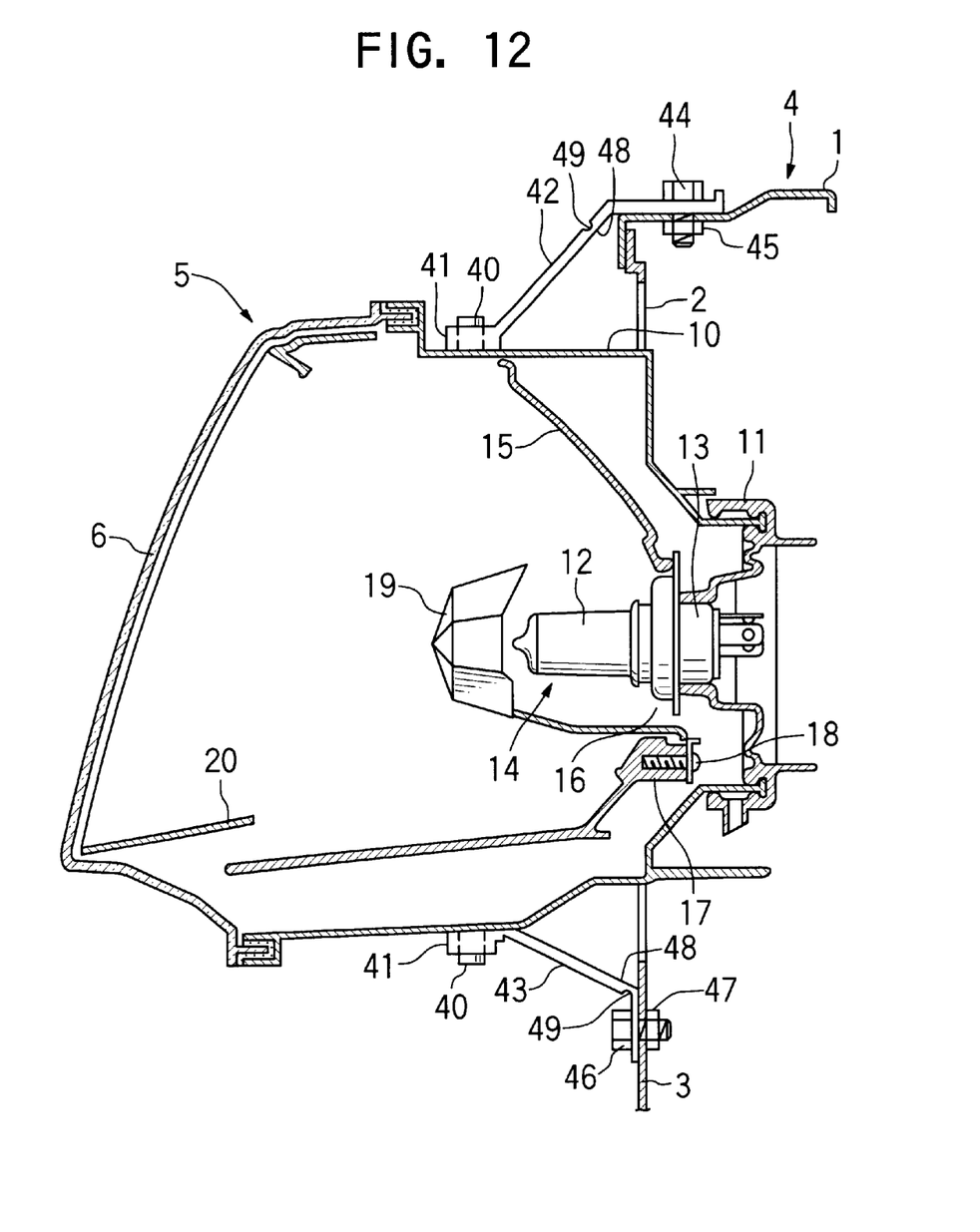
FIG. 12 is a sectional view showing yet another embodiment of the vehicle lamp device supporting structure according to the present invention.
Figure 13:
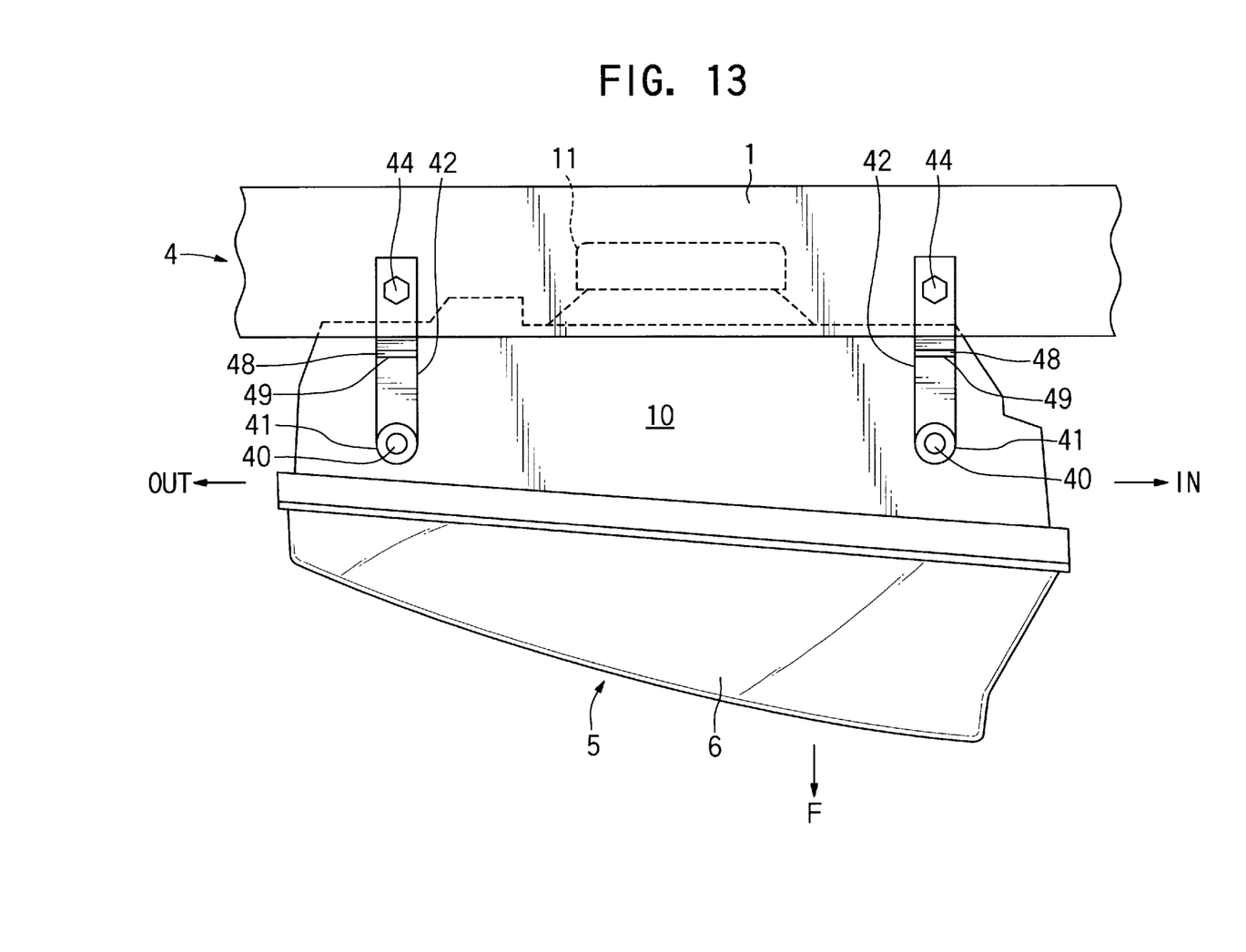
FIG. 13 is a plan view of FIG. 12.
Figure 14:
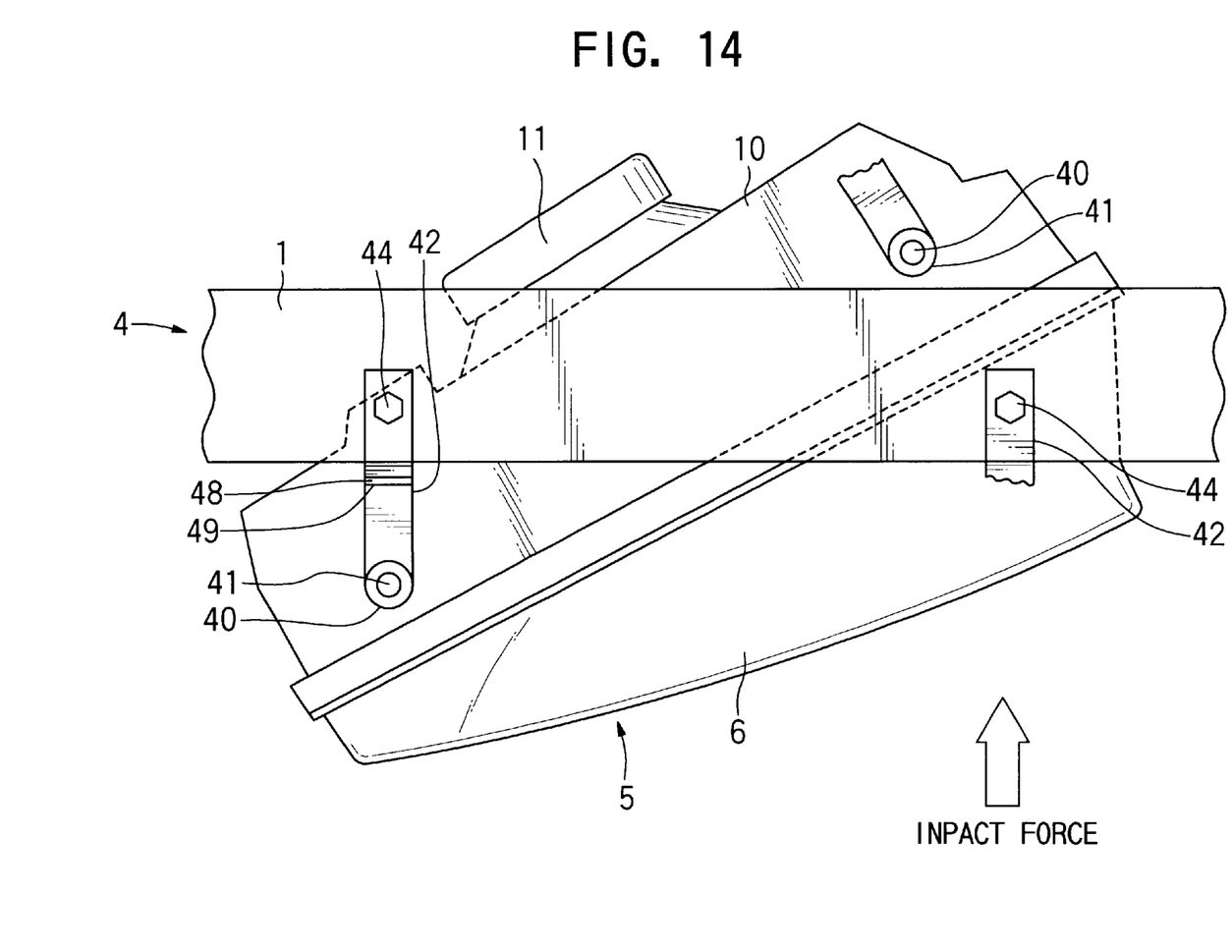
FIG. 14 is a plan view showing the movement in vehicle collision.

FIGS. 12, 13 and 14 shows yet another embodiment of the vehicle lamp device supporting structure. In this embodiment, support shaft 40 is provided which have axes corresponding to each other in the vertical direction at both right and left sides of both upper and lower faces of the lamp housing 10. Upper and lower brackets 42 and 43 is also provided which respectively have a boss 41 to support the corresponding support shaft 40 at each front end of this brackets. Thus, the headlamp unit 5 is supported by the shroud panel 4 through these four brackets 42 and 43.

In other words, the upper bracket 42 supporting the upper support shaft 40 is mounted to the shroud upper member 1 with a bolt 44 and a nut 45, and the lower bracket 43 supporting the lower support shaft 40 is mounted to the shroud side panel 3 with a bolt 46 and a nut 47.

Moreover, each of these brackets 42 and 43 are formed of synthetic resin, and a fragile portion 48 breakable in vehicle collision is provided at a predetermined position of each of these brackets 42 and 43.

In this embodiment, a groove 49 is provided which extends in the width direction or lateral direction of the vehicle and locates near the mount portion for mounting the shroud panel 4 to the shroud panel 4 between this mount portion mounted and the boss portion 41 of the brackets 42 and 43. The fragile portion 48 is formed by a thin walled portion having a smaller thickness which results from forming the groove 49.

Further, the shroud panel 4 which supports the headlamp unit 5 is provided with the opening 2 to allow the headlamp unit 5 to be rotatably displaced rearward when the bracket 42 is broken up.

In FIG. 13, IN indicates inward in the width direction of the vehicle, OUT indicating outward in the width direction of the vehicle, and F indicating forward in the front and rear direction or longitudinal direction of the vehicle. In FIGS. 12 to 14, the structure of the headlamp unit 5 itself is the same as in the aforementioned figures. Thus, the same elements in FIGS. 12 to 14 as the aforementioned figures are defined by the same reference numbers, and their description will be omitted.

The action of the vehicle lamp device supporting structure structured as above will now be described.

When the running vehicle collides with obstacle head-on and the collision position locates in almost center of the headlamp unit 5 in the width direction of the vehicle, each of the fragile portions 48 of the right and left brackets 42 are broken up, and the headlamp unit 5 is moved rearward through the opening 2. On the other hand, when the collision position locates in the right or left offset position to the headlamp unit 5 in the width direction of the vehicle, both the bracket 42 positioned on the side input the impact load and the upper or lower brackets thereof are broken up at the fragile portion 48 and the support to the shroud panel 4 is lost, as shown in FIG. 14.

Both the bracket 42 positioned on another side maintains, and the upper or lower brackets thereof maintain their un-breakage state to keep the support to the shroud panel 4.

Thus, as shown in FIG. 14, one side of the headlamp unit 5 is rotatably around the support shafts 40, 40, as a fulcrum, positioned on another side of the headlamp unit 5 and having the axes corresponding to each other in the vertical direction, and the one side of the headlamp unit 5 is displaced rearward through the opening 2, so that the impact to obstacle may be absorbed or reduced.

As described above, the vehicle lamp device supporting structure in the embodiment shown in FIGS. 12 to 14, comprises the headlamp unit 5 supported by a front end of the vehicle, in which the bracket 42 is provided for mounting both right and left side portions of the headlamp unit 5 to the shroud panel 4 through the vertical support shaft 40, the fragile portion 48 breakable in vehicle collision being provided at the bracket 42, and the shroud panel 4 supporting the headlamp unit 5 being provided with the opening 2 to allow the headlamp unit 5 to be displaced rearward when the bracket 42 is broken up at the fragile portion 48.

Therefore, when the vehicle collides with obstacle, especially when it collides with obstacle in either right or left offset position, the bracket 42 on one side input the collision load is broken up at the fragile portion 48, and thus the headlamp unit 5 is rotatably displaced around the support shaft 40, as a fulcrum, positioned on another side of the bracket 42.

Rotatably displacing the headlamp unit 5 rearward allows the impact to the obstacle to be reduced. Further, the support structure having such a simple structure may be achieved at lower cost.

The relationship between the support shaft 40 and the boss portion 41 may be reversed to this embodiment.

Specifically, even if the support shaft 40 is provided on the side of the bracket 42, and the boss portion 41 is provided on the side of the lamp housing 10, the same action and effect as described above may be obtained.

In the correspondence between the structural requirement of the present invention and the aforementioned embodiments, the vehicle lamp device according to the present invention corresponds to the headlamp unit 5, and in the same manner; the housing of the lamp device corresponds to the lamp housing 10; the shroud panel corresponds to the metal shroud panel 4 or the resin shroud 30; and the opening 2 allowing the lamp to be displaced rearward corresponds to the opening 2 or the opening 33.

However, the present invention is not be limited to such constructions of the embodiments described above.

Thus, according to the present invention, when a vehicle collides with obstacle head-on, the fragile portion is broken up or cut by an input load input into the mount bracket or the mount portion on the side of the shroud panel through the lamp device. Then, due to this breakage of the fragile portions, the lamp loses the support to the shroud panel so that the lamp may be displaced rearward through the opening. This allows the impact to obstacle to be reduced. Further, a simple structure having simply fragile portion provided in the mount bracket or the mount portion at the side of the shroud panel allows the supporting structure to be achieved at lower cost.

What is claimed is:

1. A vehicle lamp device supporting structure for supporting a vehicle lamp device (5) on the front end of a vehicle, comprising:
   a mount bracket mounting said lamp device to a vehicle body side, said mount bracket projectedly provided on a housing of said lamp device, wherein said mount bracket including a fragile portion breakable in vehicle collision; and
   a shroud panel supporting said lamp device, wherein said shroud panel including an opening allowing said lamp device to be displaced rearward when said mount bracket is broken up.

2. A vehicle lamp device supporting structure as defined in claim 1, wherein said fragile portion comprises a thin walled portion provided in said mount bracket.

3. A vehicle lamp device supporting structure as defined in claim 1, wherein said shroud panel includes a protruded portion projecting into said opening, said protruded portion supporting said mount bracket of said lamp device.

4. A vehicle lamp device supporting structure as defined in claim 1, wherein said shroud panel comprises an iron plate.

5. A vehicle lamp device supporting structure for supporting a vehicle lamp device on the front end of a vehicle, comprising:
   a bracket mounting both right and left side portions of said lamp device to a shroud panel through a vertical support shaft; wherein
   said bracket includes a fragile portion breakable in vehicle collision; and
   said shroud panel includes an opening allowing said lamp device to be displaced rearward when said bracket is broken up.

6. A vehicle lamp device supporting structure as defined in claim 5, wherein said bracket is formed of synthetic resin.

7. A vehicle lamp device supporting structure for supporting a vehicle lamp device on the front end of a vehicle, comprising,
   a shroud panel including a mount portion for mounting said lamp device, said mount portion having a fragile portion breakable in vehicle collision, wherein said shroud panel is adapted to form an opening allowing said lamp device to be displaced rearward when said fragile portion is broken up.

8. A vehicle lamp device supporting structure as defined in claim 7, wherein said shroud panel comprises a resin shroud, and said fragile portion comprises a thin walled portion.

9. A vehicle lamp device supporting structure as defined in claim 7, wherein said resin shroud includes a groove surrounding said mount portion.

* * * * *